United States Patent
Wessel et al.

(10) Patent No.: US 8,923,100 B1
(45) Date of Patent: Dec. 30, 2014

(54) MULTI-PORTION HEAT SINK FOR USE WITH WRITE POLE AND NEAR-FIELD TRANSDUCER

(71) Applicant: Seagate Technology LLC, Cupertino, CA (US)

(72) Inventors: James Gary Wessel, Savage, MN (US); Zoran Jandric, St. Louis Park, MN (US); Chris Cote, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/024,329

(22) Filed: Sep. 11, 2013

(51) Int. Cl.
  *G11B 11/00* (2006.01)
  *G11B 5/48* (2006.01)
  *G11B 5/00* (2006.01)

(52) U.S. Cl.
  CPC ...... *G11B 5/4866* (2013.01); *G11B 2005/0021* (2013.01)
  USPC .................. 369/13.33; 369/13.13; 369/112.27

(58) Field of Classification Search
  CPC ........... G11B 2005/0021; G11B 5/314; G11B 5/6088; G11B 2005/001; G11B 7/1387; G11B 11/10554; G11B 11/1058; G11B 7/1384; G11B 7/1206; G11B 5/3116
  USPC .......... 369/13.33, 13.32, 13.24, 13.14, 13.03, 369/13.02, 13.12, 13.13, 13.01, 112.27; 360/59, 125.31, 125.74; 29/603.16, 29/603.07; 219/209
  See application file for complete search history.

(56) References Cited

U.S. PATENT DOCUMENTS

| | | | |
|---|---|---|---|
| 6,665,136 B2 | 12/2003 | Clinton et al. | |
| 7,009,812 B2 | 3/2006 | Hsu et al. | |
| 7,149,055 B2 | 12/2006 | Clinton et al. | |
| 7,212,367 B2 | 5/2007 | Clinton et al. | |
| 7,239,480 B2 | 7/2007 | Hirabayashi et al. | |
| 8,077,417 B2 | 12/2011 | Mallary et al. | |
| 8,259,413 B2 | 9/2012 | Bonhote et al. | |
| 8,259,540 B1 | 9/2012 | Sahoo et al. | |
| 8,451,555 B2 * | 5/2013 | Seigler et al. | 360/59 |
| 8,451,696 B2 * | 5/2013 | Huang et al. | 369/13.02 |
| 8,486,286 B1 * | 7/2013 | Gao et al. | 216/22 |
| 8,493,693 B1 | 7/2013 | Zheng et al. | |
| 8,582,253 B1 | 11/2013 | Zheng et al. | |
| 8,670,215 B2 * | 3/2014 | Zou et al. | 360/125.31 |

(Continued)

FOREIGN PATENT DOCUMENTS

EP   1398763   5/2006

OTHER PUBLICATIONS

File History for U.S. Appl. No. 13/961,644.

*Primary Examiner* — Ali Neyzari
(74) *Attorney, Agent, or Firm* — Hollingsworth Davis, LLC

(57) ABSTRACT

An apparatus (e.g., a heat assisted magnetic recording write heat) includes a magnetic write pole having a tip portion proximate a media-facing surface. A near-field transducer is proximate the tip portion of the magnetic write pole. A first heat sink portion is provided along a first side of the tip portion that faces away from the near field transducer. The first heat sink portion includes a highly reflective, thermally conductive metal and is spaced away from the media facing surface. A second heat sink portion is provided along the first side of the tip portion between the media facing surface and the first heat sink portion. The second heat sink portion includes a relatively hard material.

20 Claims, 7 Drawing Sheets

(56) References Cited

U.S. PATENT DOCUMENTS

| | | | |
|---|---|---|---|
| 8,705,323 B2 * | 4/2014 | Contreras et al. | 369/13.32 |
| 2010/0214685 A1 | 8/2010 | Seigler et al. | |
| 2013/0107679 A1 * | 5/2013 | Huang et al. | 369/13.32 |
| 2013/0107680 A1 | 5/2013 | Contreras et al. | |
| 2013/0176838 A1 | 7/2013 | Sendur et al. | |
| 2014/0104724 A1 | 4/2014 | Shiroishi et al. | |

\* cited by examiner

| | ZnN seed (900) | Au at ABS (901) | 2nd HS portion matl (902) | Peg temp ΔT (K) (903) | Peg temp reduct. (904) | Pole temp ΔT (K) (905) | Pole temp reduct. (906) |
|---|---|---|---|---|---|---|---|
| Baseline (911) | | | Cr | 93 | | 84 | |
| Config 1 (912) | 5 nm | | Cr | 61 | -34% | 53 | -37% |
| Config 1 (913) | 5 nm | 10 nm | Cr | 60 | -34% | 52 | -39% |
| Config 3 (914) | 5 nm | 20 nm | Cr | 57 | -38% | 48 | -43% |
| Config 4 (915) | 10 nm | | Cr | 55 | -41% | 45 | -46% |
| Config 5 (916) | | | Cr | 60 | -35% | 50 | -39% |
| Config 6 (917) | 5 nm | | Ta | 65 | -30% | 58 | -31% |
| Config 7 (918) | 5 nm | 10 nm | Ta | 65 | -30% | 58 | -31% |
| Config 8 (919) | 5 nm | 20 nm | Ta | 62 | -34% | 52 | -38% |
| Config 9 (920) | | | Ta | 59 | -36% | 50 | -41% |
| Config 10 (921) | 10 nm | | Ta | 65 | -30% | 58 | -31% |
| Config 11 (922) | | | Au | 49 | -48% | 38 | -54% |

FIG. 9

MULTI-PORTION HEAT SINK FOR USE WITH WRITE POLE AND NEAR-FIELD TRANSDUCER

BACKGROUND

A heat-assisted, magnetic recording (HAMR) data storage medium uses a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

SUMMARY

The present disclosure is related to a multi-portion heat sink for use with a write pole and a near-field transducer. In one embodiment, an apparatus includes a magnetic write pole having a tip portion proximate a media-facing surface. A near-field transducer is proximate the tip portion of the magnetic write pole. A first heat sink portion is provided along a first side of the tip portion that faces away from the near field transducer. The first heat sink portion includes a highly reflective, thermally conductive metal and is spaced away from the media facing surface. A second heat sink portion is provided along the first side of the tip portion between the media facing surface and the first heat sink portion. The second heat sink portion includes a relatively hard material.

In another embodiment, an apparatus includes a magnetic write pole having a tip portion proximate a media-facing surface. A near-field transducer is proximate a first edge of the tip portion of the magnetic write pole. A cap surrounds at least one second edge of the tip portion. The cap is exposed at the media-facing surface and includes a relatively hard material that is resistant to wear. A gold, thermal diffuser is proximate the cap and spaced away from the media facing surface. A gold thermal diffuser is provided along the fourth side of the tip portion and extends away from the media-facing surface.

In another embodiment, a method involves forming a near-field transducer proximate a media-facing surface of a slider body. A magnetic write pole having a tip portion is formed proximate the near-field transducer at the media facing surface. A first heat sink portion is formed along a first side of the tip portion that faces away from the near field transducer. The first heat sink portion includes a highly reflective, thermally conductive metal. A second heat sink portion is formed along the first side of the tip portion between the media facing surface and the first heat sink portion. The second heat sink portion includes a relatively hard material.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

FIG. 9 is a table illustrating thermal analysis results for heat sink arrangements according to example embodiments.

DETAILED DESCRIPTION

The present disclosure is generally related to an apparatus (e.g., a HAMR read/write element) having first and second heat sink portions along a tip of a magnetic writer pole. The first heat sink portion (e.g., thermal diffuser) includes a highly reflective, thermally conductive metal and is spaced away from a surface of the apparatus that faces a recording media (e.g., magnetic disk). Examples of desirable diffuser materials include Au, Ag, Al, and Cu. These materials are generally not used at the media-facing surface due to low mechanical robustness and/or corrosion. A second heat sink portion (e.g., cap) includes a relatively hard material and is disposed between the media-facing surface and the first heat sink portion. The heat sinks generally improve reliability of a near-field transducer (NFT) and surrounding components.

A HAMR read/write element, sometimes referred to as a slider or read/write head, includes magnetic read and write transducers similar to those on current hard drives. For example, data may be read by a magnetoresistive sensor that detects magnetic fluctuations of a magnetic media as it moves underneath the sensor. Data may be written to the magnetic media by a write coil that is magnetically coupled to a write pole. The write pole changes magnetic orientation in regions of the media as it moves underneath the write pole. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a near-field transducer (NFT) proximate a media-facing surface (e.g., air-bearing surface, contact surface). The NFT shapes and transmits the energy to a small region on the medium. The NFT is sometimes referred to as an optical antenna, surface plasmon resonator, etc., and may include a plasmonic metal such as gold, silver, copper, aluminum, etc., and alloys thereof. The NFT for a HAMR device is very small (e.g., on the order of 10 to 100 nm, or any value therebetween) and creates a localized region of high power density in the media through an electromagnetic interaction. This results in a high temperature rise in a small region on the media, with the region exceeding the Curie temperature having dimensions less than 100 nm. This also results in high temperature rise in the slider near the NFT due to optical losses in the delivery path.

Figure 1:
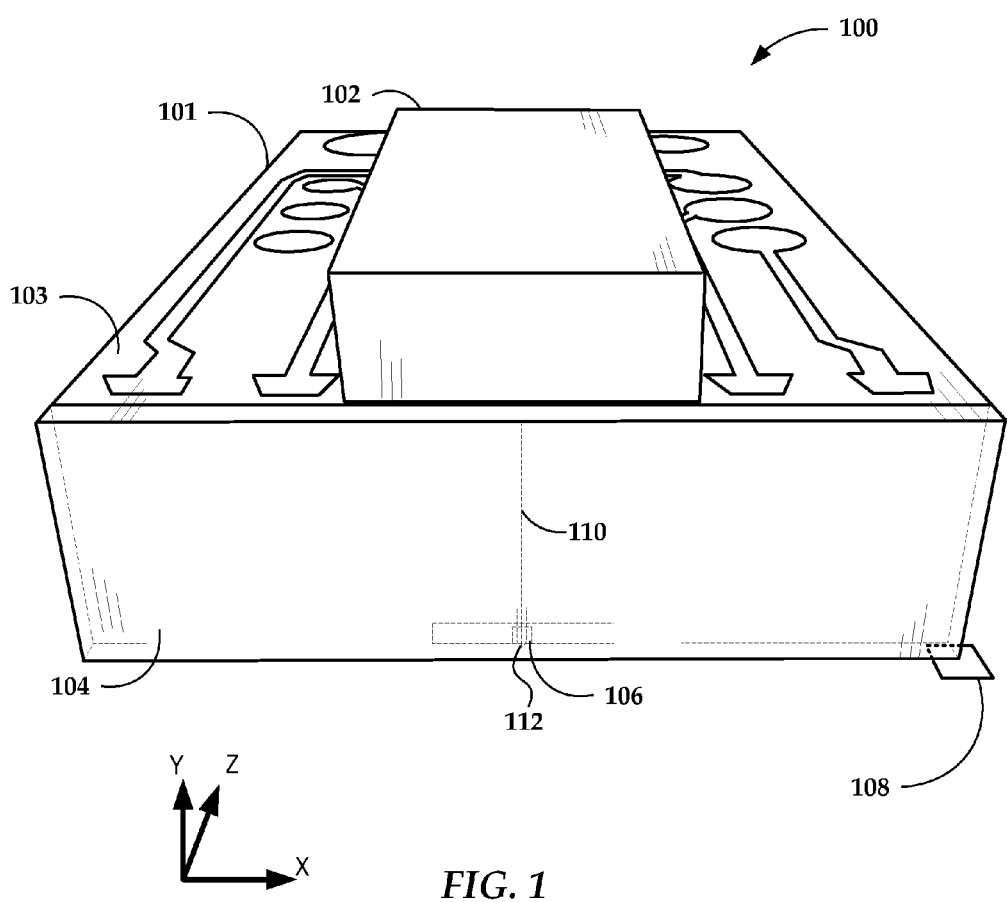
FIG. 1 is a perspective view of a slider assembly according to an example embodiment.

In reference to FIG. 1, a perspective view shows HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via a NFT 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surfaceemitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediaray component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
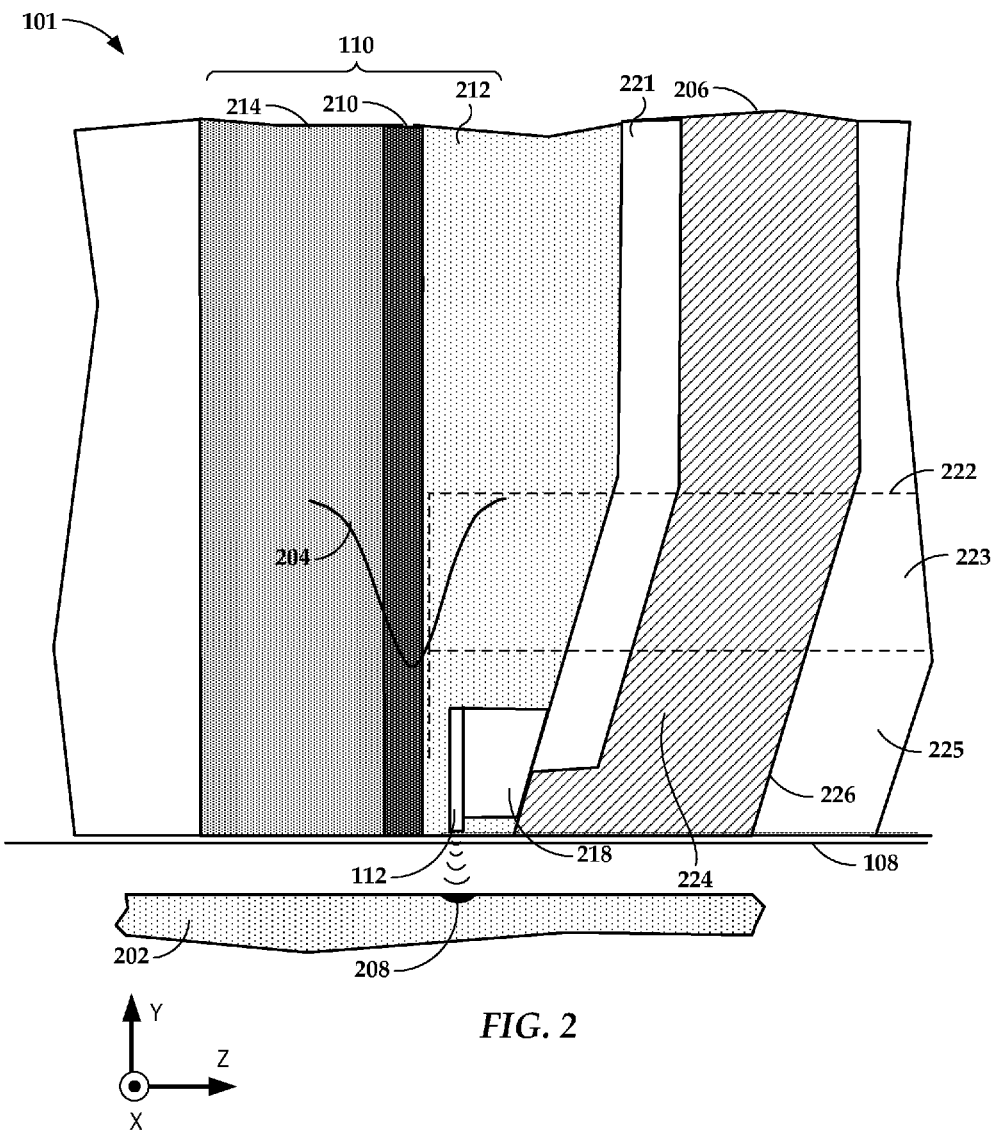
FIG. 2 is a cross sectional view of a slider assembly according to an example embodiment.

In FIG. 2, a cross-sectional view illustrates portions of the slider body 101 near the NFT 112 according to an example embodiment. In this view, the NFT 112 is shown proximate to a surface of magnetic media 202, e.g., a magnetic disk. The waveguide 110 delivers electromagnetic energy 204 to the NFT 112, which directs the energy to create a small hotspot 208 on the media 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

The waveguide 110 includes a layer of core material 210 surrounding by cladding layers 212, 214. The core layer 210 and cladding layers 212, 214 may be made from dielectric materials such as $Al_2O_3$, $SiOxNy$, $SiO_2$, $Ta_2O_5$, $TiO_2$ or $Nb_2O_5$, etc. Generally, the dielectric materials are selected so that the refractive index of the core layer 210 is higher than refractive indices of the cladding layers 212, 214. This arrangement of materials facilitates efficient propagation of light through the waveguide 110.

The energy 204 applied to the NFT 112 to create the hotspot 208 can cause a significant temperature rise in the NFT 112. The NFT 112 may be formed to include a peg, pin, bar, or other protrusion having relatively small dimensions in order to keep the generated plasmonic field small. The NFT 112 is formed from a relatively soft plasmonic metal (e.g., Au, Ag, Cu, Al, and alloys thereof) that is prone to deformation at high temperature. As a result, a heat sink 218 may be formed proximate to (or integral with) the NFT 112. The heat sink 218 may be thermally coupled to other components (e.g., the write pole 206) in order to draw heat away from the NFT 112.

Even with a heat sink 218 and other provisions, the temperatures in the write head region can be sufficiently high during operation to deform or damage the NFT 112. In some cases, the heat can cause the NFT 112 to protrude beyond the media-facing surface 108. If there is head-to-medium contact in such a case, NFT material can be deposited on the media-facing surface 108 and/or the media 202. This can contaminate the media-facing surface 108 and/or media 202, which affects performance. The heat may also cause other damage, such as corrosion of the write pole 206 and/or weakening of a head overcoat that may be deposited over surface 108.

In order to further dissipate heat and reduce protrusion of the NFT 112, the illustrated slider body 101 includes an additional heat sink assembly 222 that has portions of different material. The heat sink assembly 222 is located along a tip portion 224 of the write pole 206 that is proximate the media facing surface 108. The heat sink assembly 220 is proximate to at least a first side 226 of the tip portion that faces away from the NFT 112, and may surround other sides as well.

The heat sink assembly 222 includes a first heat sink portion 223 along the first side 226 of the tip portion 224. The first heat sink portion 223 is formed of a relatively soft, thermally conductive metal (e.g., Au, Ag, Cu, Al, and alloys thereof) and that may also be highly reflective. High reflectivity will help to minimize local absorption of the laser energy in the heat sink assembly 222.

The first heat sink portion 223 is spaced away from the media facing surface 108 to minimize exposure to air and other components. Some of these materials (e.g., Al, Cu) of the first heat sink portion 223 are susceptible to corrosion, and so it is desirable to minimize exposure at the media-facing surface 108. Similarly, some of the materials (e.g., Au, Ag) of the first heat sink portion 223 are prone to smearing, and may cause galvanic corrosion on the write pole 206. As such, it may be desirable to limit exposure of these types of materials at the media-facing surface 108.

The heat sink assembly 222 includes a second heat sink portion 225 (also referred to herein as a "cap") along the first side 226 of the tip portion 224. The second heat sink portion 225 is located between the media facing surface 108 and the first heat sink portion 223, The second heat sink portion 225 is formed of a relatively hard material such as metals like Cr and/or Ta, and alloys thereof. The second heat sink portion 225 may be formed of dielectrics such as alumina, silica, diamond-like-carbon (DLC) or SiC.

The second heat sink portion 225 may be configured to thermally protrude from the media-facing surface 108 farther than the near-field transducer 112 in response to plasmonic excitation of the near-field transducer 112. This may help prevent the near-field transducer 112 from contacting a media surface, which could result in corrosion of the media and/or media facing surface 108 of the slider body 101. As such, the relatively hard material may be chosen to be resistant to at least one of burnish, corrosion, abrasion, and wear. Because, the thermal diffuser and first heat sink portion 223 are generally very effective at removing NFT heat, the material chosen for the second heat sink portion 225 does not need to be as thermally conductive as the first heat sink portion 223. Thus, the cap material of the second heat sink portion 225 can be constructed of dielectric materials with minimal thermal penalty.

The slider body 101 may also include a thermal diffuser 221 to further dissipated heat. The thermal diffuser 221 is formed of a relatively soft, thermally conductive metal (e.g., Au, Ag, Cu, Al, and alloys thereof). The thermal diffuser 221 spaced away from the media-facing surface 108, and faces the same side of the write pole 206 as the NFT 112. The thermal diffuser overlaps the NFT 112 near the tip portion 224 and may contact part of the NFT heat sink 218.

Figure 3:
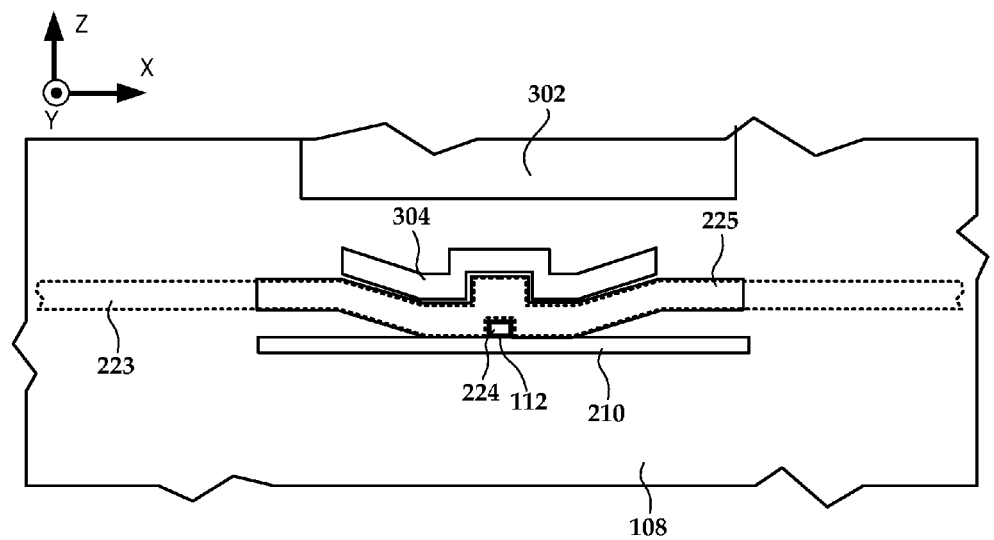
FIG. 3 is a plan view of a media-facing surface according to an example embodiment.

In reference now to FIG. 3, a plan view of the media-facing surface 108 according to an example embodiment illustrates details of the heat sink portions 223, 225. The first heat sink portion 223 is spaced away from the media-facing surface 108, and so is drawn with hidden lines. The second heat sink portion/cap 225 is exposed at the media facing surface 108, and so is drawn in solid lines. Also shown exposed at the media-facing surface 108 are ends of the waveguide 210, tip portion 224 of the write pole, and a part of a return pole 302. It should be noted that the waveguide 210 may be terminated away from the media-facing surface 108, and so need not be exposed as shown here.

The view in FIG. 3 shows that the first heat sink portion 223 and the second heat sink portion 225 extend outwards from the tip portion 224 in a cross-track direction (positive and negative x-direction). It can also be seen that the first heat sink portion 223 extends outwards further in the cross-track direction than the second heat sink portion 225. The first heat sink portion 223 and the second heat sink portion 225 surround three sides of the tip portion 224. The near field transducer 112 faces a different, fourth side of the tip portion 224.

Also seen in this view is a second cap portion 304. The second cap portion 304 may be made from a different material than the second heat sink portion/cap 225 or the same material. In the latter case, the cap portion 304 may be considered integral with the second heat sink portion/cap 225. Generally the second cap portion 304 is chosen to be resistant to at least one of burnish, corrosion, abrasion, and wear, as it may also be configured to extend outward from the media-facing surface when the NFT 112 is heated. The second cap portion 304 facilitates dissipating heat towards the return pole 302.

Figure 4:
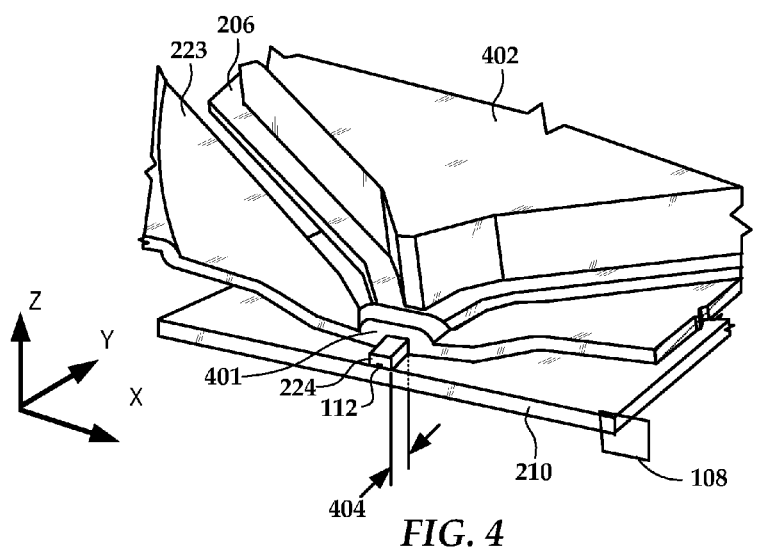
FIGS. 4, 5, and 6 are perspective views showing a heat sink portion according to example embodiments.
Figure 5:
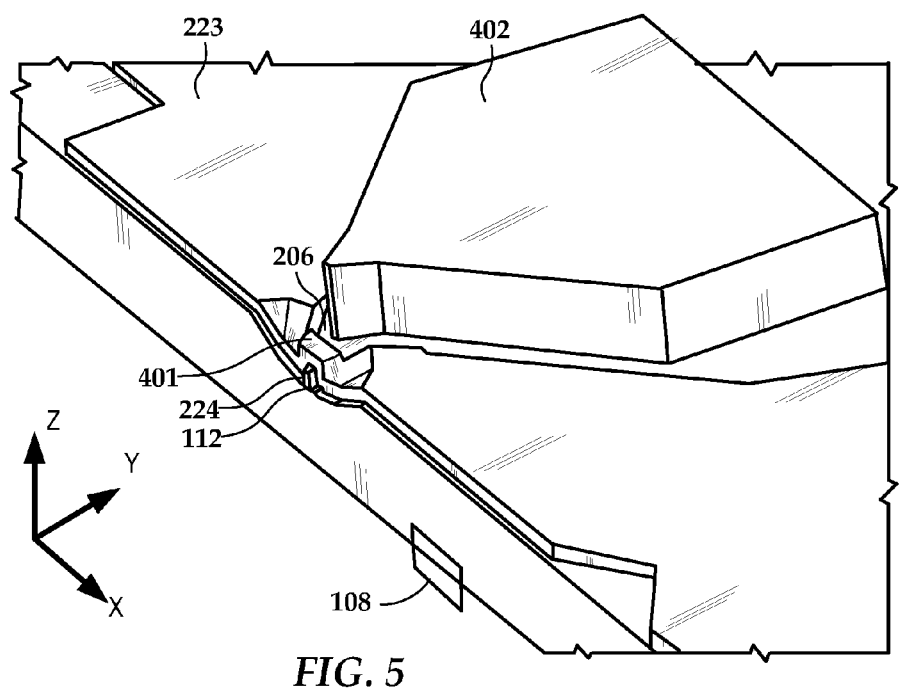

In reference now to FIGS. 4 and 5, perspective views show aspects of the first heat sink portion 223 according to example embodiments. The second heat sink portion 223 is removed in these views for purposes of clarity. A relatively small part 401 of the first heat sink portion 223 surrounds the tip portion 224 of the write pole. This portion 401 is spaced away from the media-facing surface 108 by a spacing distance 404 (shown in FIG. 4). For some of the analyses below, this spacing distance 404 is set to zero, e.g., a part of the first heat sink portion 223 is exposed at the media-facing surface 108.

The majority of the first heat sink portion 223 may extend at least partially along a yoke 402 that is coupled to the magnetic write pole 206. The yoke 402 extends away from the media facing surface 108, and couples the write pole 206 to a return pole and coil (not shown) that are part of the write transducer. The first heat sink portion 223 facilitates dissipating heat inwards to the yoke 402. The first heat sink portion 223 also dissipates heat in the cross-track direction, which reduces concentration of heat at the NFT 112.

Figure 6:
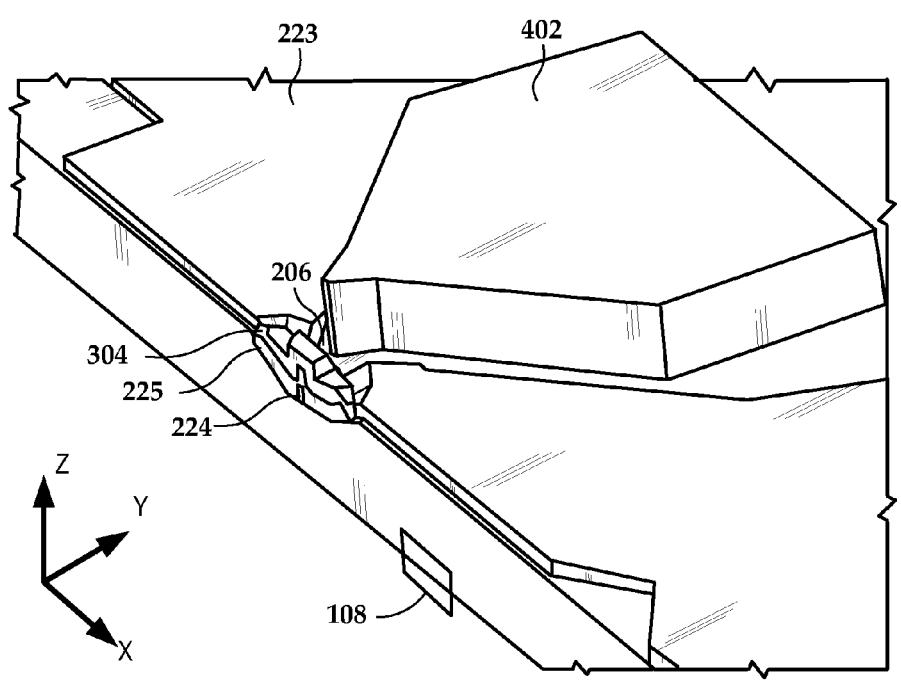

In FIG. 6, a perspective view shows aspects of the second heat sink portion 225 according to an example embodiment. A ZrAu (or other alloy) seed layer may be deposited on the first heat sink portion 223. The second heat sink portion 225 is formed on the seed layer in such a case. The second cap portion 304 is also shown deposited on the second heat sink portion 225. Both the second heat sink portion 225 and second cap portion 304 are exposed at (e.g., extend to, flush with) media-facing surface 108.

As noted above, the NFT 112 is an epicenter of heat that is generated as a by-product of delivering laser energy to the HAMR media. Accordingly, it is desirable to place the material with the highest thermal conductivity, the first heat sink portion 223, as close as possible to the NFT 112 but protected by the second heat sink portion 225. The combination of high thermal conductivity of the first heat sink portion 223 combined with mechanical robustness of the second heat sink portion 225 may provide improved performance and reliability compared to a single material heat sink.

Figure 7:
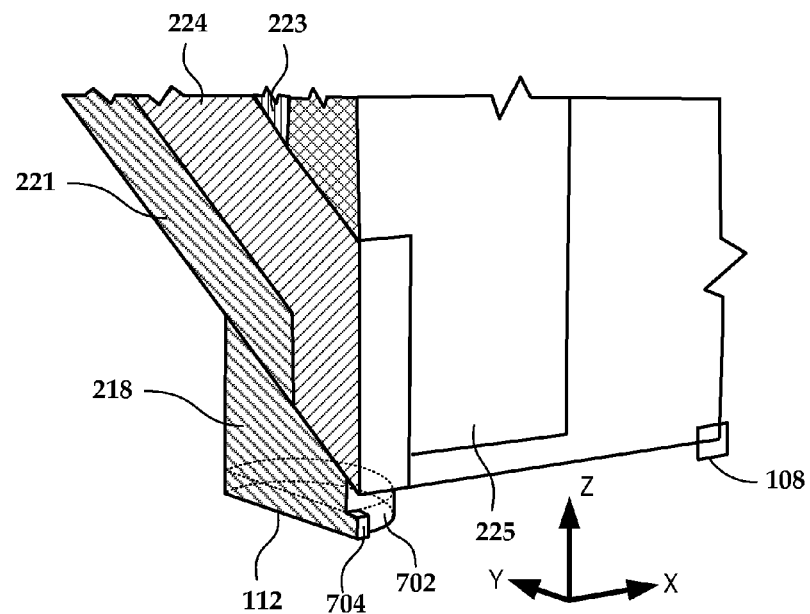
FIG. 7 is a perspective cutaway view of a near-field transducer and surrounding components according to an example embodiment.

In FIG. 7, a perspective cutaway view shows a close-up of the NFT 112 and surrounding components according to an example embodiment. As previously described, the heat sink 218 is placed between the NFT 112 and tip portion 224 of the write pole. As can be seen in this view, the NFT 112 includes a circular disk portion 702 and peg 704 that extends to the media-facing surface 108. The second heat sink portion 225 is exposed at the media surface 108 along with the tip portion 224 of the write pole and the peg 704 of the NFT 112. The first heat sink portion 223 is directly above the NFT 112 and its associated heat sink 218, and may overlap at least half of the NFT disk 702 as viewed from the xy-plane. The thermal diffuser 221 can be seen spaced apart from and extending away from the media-facing surface 108 along a side of the write pole 224. The thermal diffuser 221 reduces absorption and increases conduction of heat away from the NFT 112.

Figure 8:
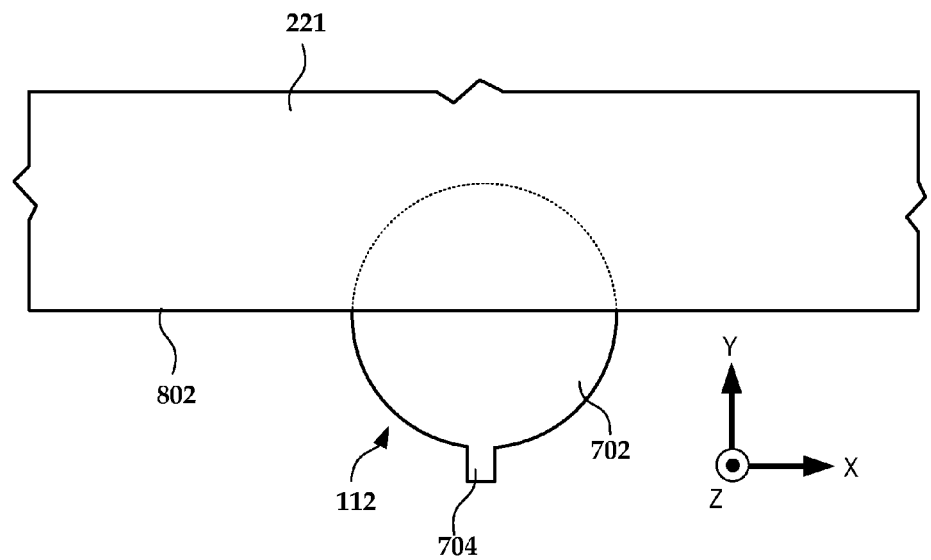
FIG. 8 is a plan view showing an overlap between a near-field transducer heat sink/thermal diffuser according to an example embodiment.

In FIG. 8, a plan view shows the overlap between the disk 702 of the NFT 112 and the thermal diffuser 221. The thermal diffuser 221 interfaces with the NFT heat sink 218 and overlaps the NFT 112 (e.g., offset in the z-direction) along interface edge 802. The thermal diffuser 221 overlaps about half of the disk 702 as seen from this view. The examples herein need not be limited to this amount of overlap. Generally, an optimum amount of overlap may depend on a wide number of factors, such as size of the NFT 112, size/material of the write pole tip portion 224, etc.

In reference now to FIG. 9, a table illustrates thermal analysis results for heat sink arrangements according to example embodiments. Individual design variations are listed in rows 911-922, with the arrangement in row 911 representing an existing baseline to which the other variants in rows 912-922 are compared. The baseline 910 arrangement uses a Cr heat sink that has a similar profile at the media-facing surface as the second heat sink portion illustrated above, except that the Cr heat sink encompasses the tip portion of the write pole without any material of high thermal conductivity such as in the first heat sink portions described above.

The configurations in rows 912-921 utilize a two-portion heat sink of different material of similar geometry, the first portion spaced away from the media-facing surface and formed of a material of high thermal conductivity (Au in these examples). The material used for a second heat sink portion which is exposed at the media-facing surface is a relatively hard metal, as indicated in column 902. For purposes of comparison, the second heat sink portion for the example in row 922 is also Au.

Column 900 indicates whether a ZrN seed was used, and if so, the thickness. It should be noted that Zr, ZrN, ZrAu, and Cr, among others, may be used as a seed material Column 901 indicates whether a region of Au from the first heat sink portion extends to the media-facing surface, and if so, the thickness. Columns 903 and 904 indicate a rise in temperature at the NFT peg over ambient temperature as both degrees K and as a percentage improvement over baseline. Columns 905 and 906 indicate a rise in temperature at the tip portion of the write pole over ambient temperature as both degrees K and as a percentage improvement over baseline.

The chart in FIG. 9 generally indicates that having Au exposed at the media-facing surface gives the best thermal result. One reason for this is the Au is highly reflective which results in less heating than if the light were incident on second heat sink materials such as Cr and/or Ta. However, as previously noted, there are risks in having significant amounts of Au exposed at the media-facing surface, and so for long-term reliability, a configuration without exposed Au may be desirable, even if temperatures are somewhat higher.

Figure 10:
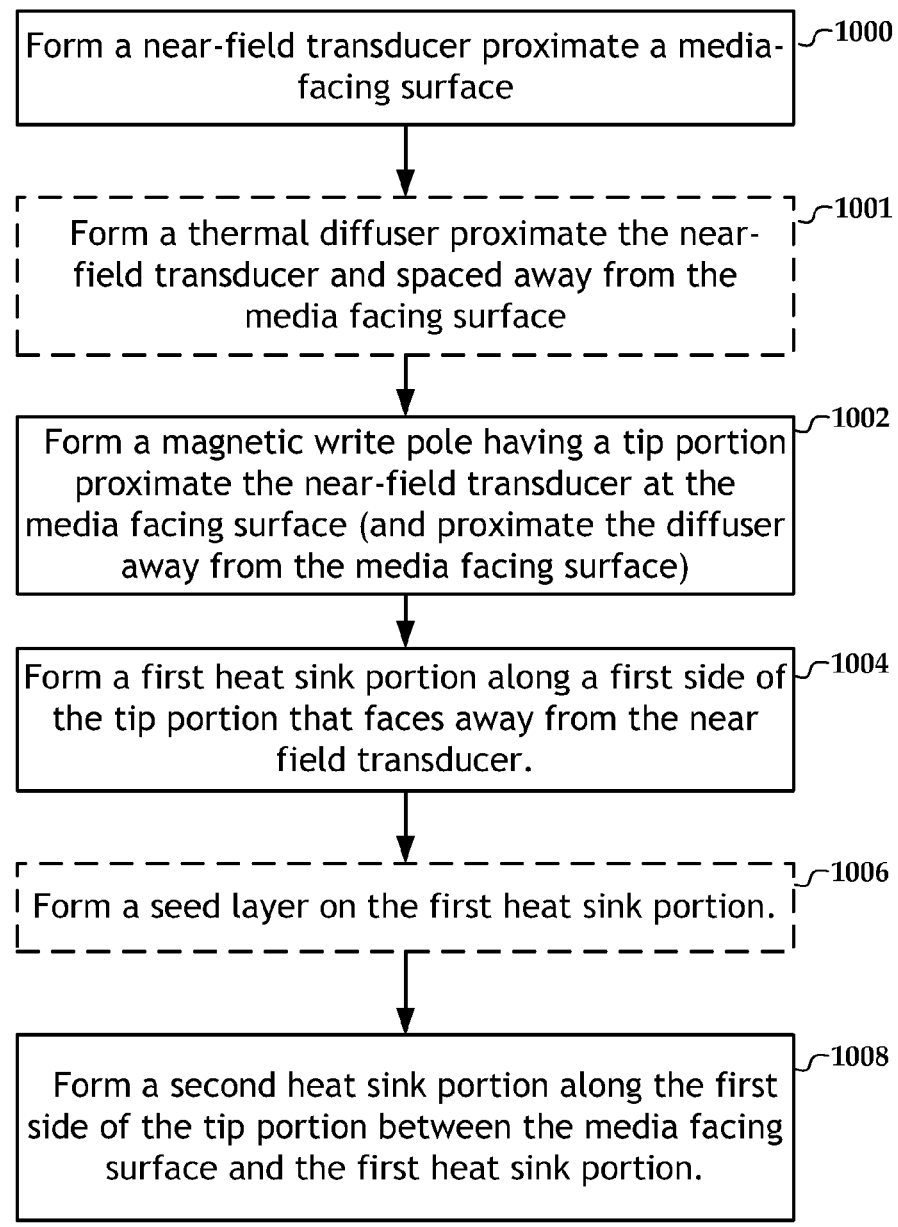
FIG. 10 is a flowchart illustrating a method according to an example embodiment.

In reference now to FIG. 10, a flowchart illustrates a method of forming a heat sink according to an example embodiment. The method involves forming 1000 a near-field transducer proximate a media-facing surface. A thermal diffuser may optionally be formed 1001 proximate the near-field transducer but spaced away from the media-facing surface. A magnetic write pole having a tip portion is formed 1002 proximate the near-field transducer at the media facing surface. A first heat sink portion is formed 1004 along a first side of the tip portion that faces away from the near field transducer. The first heat sink portion includes a relatively soft, thermally conductive metal (e.g., Au, Ag, Cu, and/or Al, and alloys thereof) and is spaced away from the media facing surface. A seed layer may optionally be formed 1006 on the first heat sink portion. A second heat sink portion is formed 1008 along the first side of the tip portion between the media facing surface and the first heat sink portion. The second heat sink portion includes a relatively hard metal, such as Cr and/or Ta.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
   a magnetic write pole having a tip portion proximate a media-facing surface;
   a near-field transducer proximate the tip portion of the magnetic write pole;
   a first heat sink portion along a first side of the tip portion that faces away from the near field transducer, the first heat sink portion comprising a highly reflective, thermally conductive metal and is spaced away from the media facing surface; and
   a second heat sink portion along the first side of the tip portion between the media facing surface and the first heat sink portion, the second heat sink portion comprising a relatively hard material.

2. The apparatus of claim 1, wherein the first heat sink portion and the second heat sink portion extend outwards from the tip portion in a cross-track direction, wherein the first heat sink portion extends outwards further in the cross-track direction than the second heat sink portion.

3. The apparatus of claim 1, wherein the first heat sink portion and the second heat sink portion surround three sides of the tip portion, wherein the near-field transducer faces a different, fourth side.

4. The apparatus of claim 1, wherein the highly reflective, thermally conductive metal comprises at least one of Au, Ag, Cu, and Al.

5. The apparatus of claim 1, wherein the relatively hard material comprises a dielectric.

6. The apparatus of claim 1, wherein the relatively hard material comprises at least one of Cr and Ta.

7. The apparatus of claim 1, wherein the relatively hard metal is resistant to at least one of burnish, corrosion, and wear.

8. The apparatus of claim 1, wherein an interface between the first heat sink portion and the second heat sink portion is located over the near-field transducer.

9. The apparatus of claim 1, further comprising a yoke coupled to the magnetic write pole, the yoke extending away from the media facing surface, wherein the first heat sink portion extends at least partially along the yoke away from the media facing surface.

10. The apparatus of claim 1, wherein the second heat sink portion is configured to thermally protrude from the media-facing surface farther than the near-field transducer in response to plasmonic excitation of the near-field transducer.

11. The apparatus of claim 1, further comprising a thermal diffuser proximate a second side of the magnetic write pole that faces the near-field transducer, the diffuser spaced away from the media-facing surface.

12. An apparatus comprising:
    a magnetic write pole having a tip portion proximate a media-facing surface;
    a near-field transducer proximate a first edge of the tip portion of the magnetic write pole;
    a cap surrounding at least one second edge of the tip portion, the cap exposed at the media-facing surface and comprising a relatively hard material that is resistant to wear;
    a heat sink proximate the cap and spaced away from the media facing surface; and
    a thermal diffuser along the fourth side of the tip portion and extending away from the media-facing surface.

13. The apparatus of claim 12, wherein the cap and the heat sink extend outwards from the tip portion in a cross-track direction, wherein the heat sink extends outwards further in the cross-track direction than the cap.

14. The apparatus of claim 12, wherein the heat sink and the cap surround three sides of the tip portion, wherein the near-field transducer and thermal diffuser face a different, fourth side of the tip portion.

15. The apparatus of claim 12, wherein the relatively hard material comprises at least one of Cr and Ta.

16. The apparatus of claim 12, wherein the thermal diffuser interfaces with a gold heat sink of the near-field transducer.

17. The apparatus of claim 12, further comprising a yoke coupled to the magnetic write pole, the yoke extending away from the media facing surface, wherein the heat sink extends along the yoke away from the media facing surface.

18. The apparatus of claim 12, wherein the cap is configured to thermally protrude from the media-facing surface farther than the near-field transducer in response to plasmonic excitation of the near-field transducer.

19. A method comprising:
    forming a near-field transducer proximate a media-facing surface of a slider body;
    forming a magnetic write pole having a tip portion proximate the near-field transducer at the media facing surface;
    forming a first heat sink portion along a first side of the tip portion that faces away from the near field transducer, the first heat sink portion comprising a highly reflective, thermally conductive metal; and
    forming a second heat sink portion along the first side of the tip portion between the media facing surface and the first heat sink portion, the second heat sink portion comprising a relatively hard material.

20. The method of claim 19, further comprising forming a seed layer on the first heat sink portion before forming the second heat sink portion.

\* \* \* \* \*